US008988188B2

(12) United States Patent
Chang

(10) Patent No.: US 8,988,188 B2
(45) Date of Patent: Mar. 24, 2015

(54) SYSTEM AND METHOD FOR MANAGING ENTRANCE AND EXIT USING DRIVER FACE IDENTIFICATION WITHIN VEHICLE

(75) Inventor: Jae Young Chang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 288 days.

(21) Appl. No.: 13/173,421

(22) Filed: Jun. 30, 2011

(65) Prior Publication Data

US 2012/0126939 A1 May 24, 2012

(30) Foreign Application Priority Data

Nov. 18, 2010 (KR) ........................ 10-2010-0115250

(51) Int. Cl.
*G05B 19/00* (2006.01)
*G07C 9/00* (2006.01)

(52) U.S. Cl.
CPC ........ *G07C 9/00563* (2013.01); *G07C 9/00571* (2013.01)
USPC ........................................................ 340/5.53

(58) Field of Classification Search
CPC .................................................. G07C 9/00071
USPC ..................... 340/5.2, 5.52, 5.53, 541, 426.1; 382/118, 115
See application file for complete search history.

(56) References Cited

U.S. PATENT DOCUMENTS 7,183,895 B2 2/2007 Bazakos et al.
7,602,947 B1 * 10/2009 Lemelson et al. ............ 382/116
7,786,897 B2 * 8/2010 Alves ............................ 340/937
2005/0171787 A1 * 8/2005 Zagami ............................ 705/1
2006/0126906 A1 * 6/2006 Sato et al. ..................... 382/118
2006/0158307 A1 * 7/2006 Lee et al. ..................... 340/5.53
2006/0208169 A1 * 9/2006 Breed et al. ................... 250/221
2006/0261931 A1 * 11/2006 Cheng ........................ 340/426.1
2006/0273880 A1 * 12/2006 Yuhara ......................... 340/5.83
2007/0075827 A1 * 4/2007 Itoh et al. ..................... 340/5.53
2007/0133844 A1 * 6/2007 Waehner et al. .............. 382/118
2007/0140532 A1 * 6/2007 Goffin ........................... 382/118
2007/0159309 A1 * 7/2007 Ito et al. ..................... 340/425.5
2007/0247279 A1 * 10/2007 Safonov ....................... 340/5.53
2008/0048887 A1 * 2/2008 Aoki et al. .................... 340/937

(Continued)

FOREIGN PATENT DOCUMENTS

JP 63118472 A 5/1988
JP 2002288670 A 10/2002

(Continued)

*Primary Examiner* — Hai Phan
*Assistant Examiner* — Zhen Y Wu
(74) *Attorney, Agent, or Firm* — Mintz Levin Cohn Ferris Glovsky and Popeo, P.C.; Peter F. Corless

(57) ABSTRACT

The present invention provides a system and method for managing entrance and exit of a vehicle from a facility via a driver facial identification operation within a vehicle. More specifically, the present invention includes a vehicle configured to recognize driver's face within vehicle by performing a driver identification operation, and then configured to send driver information via a wireless communication to a vehicle access control center in response to a positive identification of the driver's face. The vehicle access control center in the present invention then performs a verification of the driver information upon receiving the driver information from the vehicle, and controls an opening and closing of a gate for vehicle access according to of the verification of the driver information.

17 Claims, 2 Drawing Sheets

(56) References Cited

U.S. PATENT DOCUMENTS

| | | | | |
|---|---|---|---|---|
| 2008/0094170 | A1* | 4/2008 | Portele et al. | 340/5.2 |
| 2008/0170758 | A1* | 7/2008 | Johnson et al. | 382/115 |
| 2008/0252412 | A1* | 10/2008 | Larsson et al. | 340/5.2 |
| 2008/0285802 | A1* | 11/2008 | Bramblet et al. | 382/103 |
| 2009/0018859 | A1* | 1/2009 | Purifoy et al. | 705/1 |
| 2009/0072972 | A1* | 3/2009 | Pederson | 340/541 |
| 2009/0123031 | A1* | 5/2009 | Smith et al. | 382/104 |
| 2009/0251541 | A1* | 10/2009 | Chew | 348/148 |
| 2009/0284359 | A1* | 11/2009 | Huang et al. | 340/426.1 |
| 2010/0111377 | A1* | 5/2010 | Monroe | 382/118 |
| 2010/0141749 | A1* | 6/2010 | Murakami | 348/77 |
| 2011/0057816 | A1* | 3/2011 | Noble et al. | 340/937 |

FOREIGN PATENT DOCUMENTS

| | | | |
|---|---|---|---|
| JP | 2008143220 | A | 6/2008 |
| JP | 2010108046 | A | 5/2010 |
| KR | 10-2004-0074242 | A | 8/2004 |
| KR | 10-2004-0089572 | | 10/2004 |
| KR | 10-2007-0101963 | | 10/2007 |
| KR | 10-2009-0124253 | A | 3/2009 |

* cited by examiner

SYSTEM AND METHOD FOR MANAGING ENTRANCE AND EXIT USING DRIVER FACE IDENTIFICATION WITHIN VEHICLE

CROSS-REFERENCES TO RELATED APPLICATIONS

Priority to Korean Patent Application Number 10-2010-0115250, filed on Nov. 18, 2010 which is herein incorporated by reference in its entirety, is claimed.

BACKGROUND OF THE INVENTION

1. Field of the Invention

The present invention relates to a system and a method for managing entering and exiting a secure facility using driver facial identification within a vehicle, and more particularly, to a technology for authenticating a driver's face within a vehicle without stopping the vehicle or having to run a separate operation when the vehicle passes a security facility. More specifically, the present invention determines whether a vehicle can enter and exit a facility by transmitting security information related to a facial authentication of a driver to a security facility via a wireless communication.

2. Description of the Related Art

In general, a vehicle access control system is a system for managing the entrance and exit of a vehicle via recognition of a vehicle number or recognition of a vehicle ID in a building or an apartment. In these conventional systems, a camera is typically utilized to recognize the vehicle number or the vehicle ID, e.g., vehicle's license plate. Image data of the camera, however, is negatively affected by the quantity of light surrounding the image being captured. That is, the brightness of the image is changed depending on the time of day, the weather, etc. For example, the amount of light in any given area, especially outdoors, is greatly different in the early morning and evening than during, for example, midday. Accordingly, the probability of identification success is weak during these time periods. Moreover, such recognition method of vehicle number or recognition method of vehicle ID can be readily counterfeited by a user forging the tags.

SUMMARY OF THE INVENTION

The present invention has been made in view of the above problems, and provides a method of authenticating a driver's face within a vehicle when the vehicle enters and exits a facility.

According to one aspect of the present invention, a system for managing entrance and exit of a vehicle using a driver facial identification within a vehicle is provided. In particular, the system includes a vehicle configured to recognize driver's face within vehicle via performance of a driver identification technique to obtain facial information related to the driver. The vehicle then sends the facial information via a wireless communication to a vehicle access control center within the facility once the vehicle is able to authenticate the driver's facial information.

To verify whether the driver has access to a particular facility, however, vehicle access control center performs a verification of the driver's facial information when the driver facial information is received from the vehicle, and controls an opening and/or closing of a gate for vehicle access in accordance with a positive verification.

In some embodiments of the present invention, the vehicle may include a wireless communication unit to perform a wireless communications with the vehicle access control center; an image input unit to photograph a driver's face within vehicle; a storage unit to store facial characteristic information of a driver/user; and a controller to extract facial characteristic information from the photographed image. The control then compares the extracted facial characteristic information with the facial characteristic information of the storage unit to perform an identification/verification of the drivers face. The controller then determines whether there has been a positive verification of the driver's facial characteristics by comparing the extracted facial characteristic information with the facial characteristic information of the storage unit.

If there the extracted facial information and the stored facial information are identical, a positive verification has occurred. However, the controller determines that the driver is not registered when the extracted facial characteristic information is not identical with the facial characteristic information of the storage unit and performs a new registration of said driver's facial characteristic information.

The vehicle may further include a display unit which displays the result of the identification and a screen for inputting information for a new registration.

The vehicle access control center, in some embodiments of the present invention may include a wireless communication unit to perform a wireless communications with one or more vehicles; a storage unit which stores facial characteristic information for one or more individuals having permission to access the facility; an access management unit which compares the facial characteristic information received from the vehicle with the facial characteristic information stored in the storage unit to perform a identification/verification of driver's facial characteristics; and a gate controller to control the opening and closing of a gate under control of the access management unit.

The wireless communication may performed by using, e.g., either an infrared ray (IR), a radio frequency (RF), BLUETOOTH®, WiFi, ZIGBEE®, a near field communication (NFC), and a radio frequency identification (RFID).

Furthermore, in some embodiments of the present invention, the controller may request the image input unit photograph the driver's face when the vehicle is in an ignition is turned on and the vehicle is stopped.

According to another aspect of the present invention, provided is a method of managing entrance and exit of vehicle using driver facial identification/verification within a vehicle. In this illustrative embodiment of the present invention the method initiates by photographing a face of driver within a vehicle. Then facial characteristic information is extracted from data within the photographed image and a driver identification/verification technique is performed using the facial characteristic information extracted. Subsequently, the facial characteristic information is sent to a vehicle access control center via a wireless communication once the driver's face has been verified by the vehicle. Upon receiving the driver's facial characteristic information, a facility identification/verification is performed using the facial characteristic information by the vehicle access control center. A gate is then opened for vehicle access in response to a positive identification.

As stated above, the face of driver may be photographed when the vehicle ignition is turned on or when a door of vehicle is opened or closed, and the vehicle is stopped.

In addition, opening a gate for vehicle access when the driver's facial information has been verified may be further configured to determine a positive verification has been made when facial characteristic information that exists among previously stored information associated with a particular individual is identical to the facial characteristic information received from the vehicle for that same particular individual.

Furthermore, vehicle access verification/identification may be performed by respectively comparing additional information and vehicle information as well as the facial characteristic information. This additional information may be for instance a social security number, a name, an address, and/or a telephone number of driver, and the vehicle information may be for instance a vehicle manufacturing company, a vehicle model, and/or a frame serial number.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Hereinafter, a system and a method for managing entrance and exit using driver face identification within a vehicle according to an exemplary embodiment of the present invention is described with reference to FIGS. 1 and 2.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
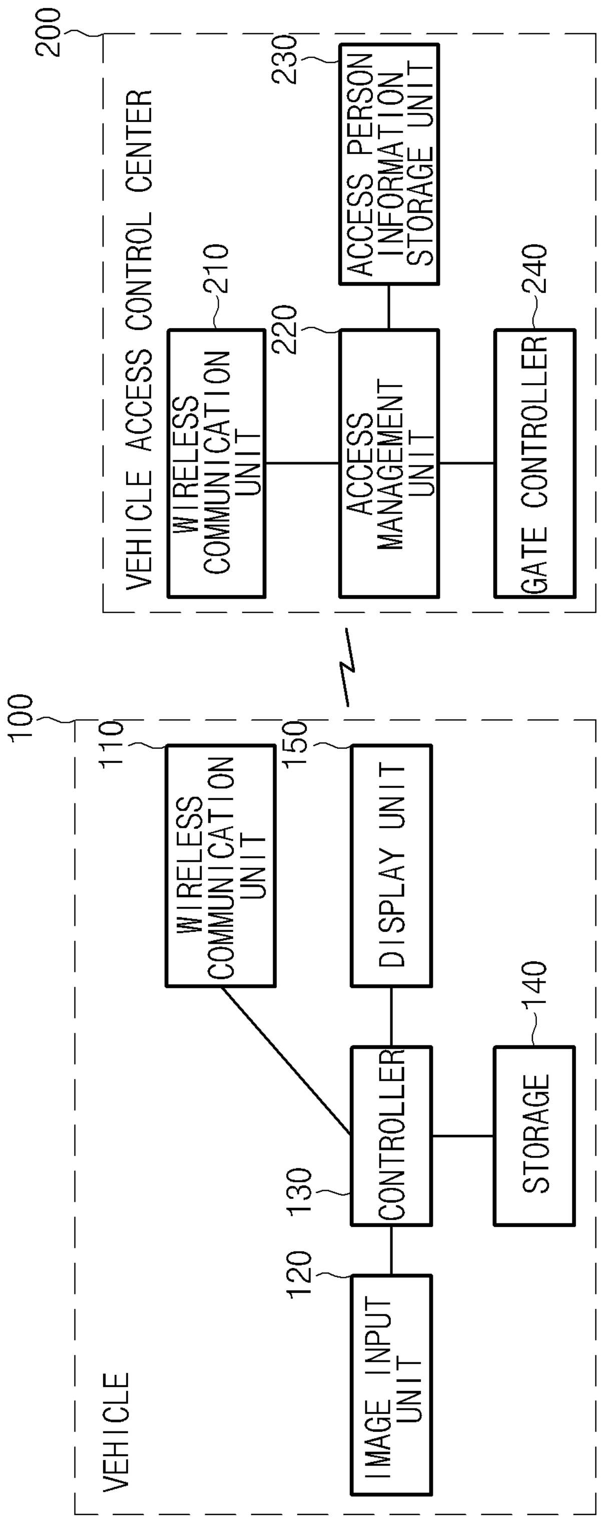
FIG. 1 is a view illustrating a configuration of a system for managing entrance and exit of a facility by verification of a driver's face within a vehicle according to an exemplary embodiment of the present invention.
Figure 2:
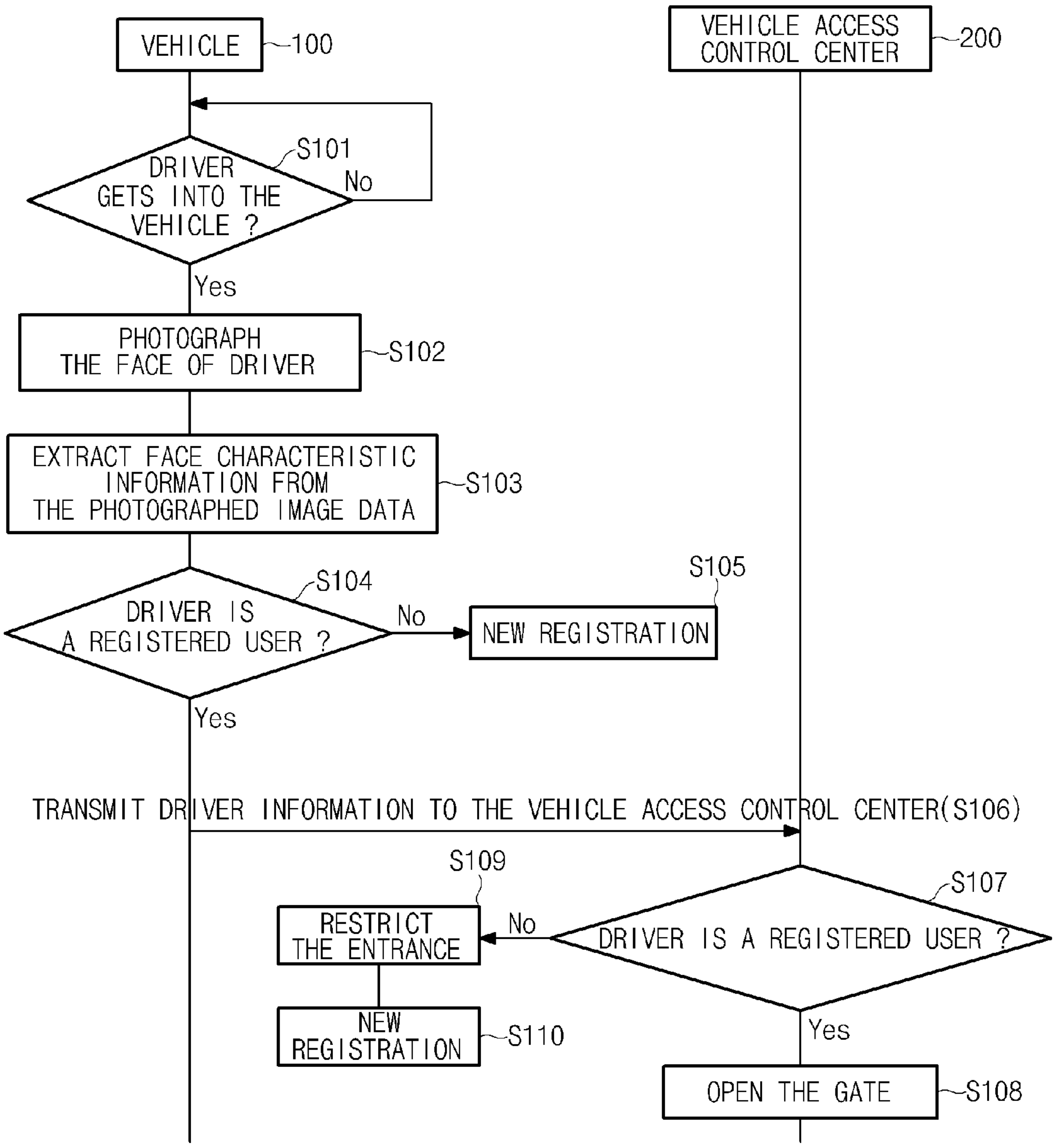
FIG. 2 is a flow chart illustrating a method of managing entrance and exit of a facility by verification of a driver's face within a vehicle according to an exemplary embodiment of the present invention.

FIG. 1 is a view illustrating a configuration of a system for managing entrance and exit of a facility by verification of a driver's face within a vehicle according to an exemplary embodiment of the present invention.

The system for managing entrance and exit of a facility by verification of a driver's face within a vehicle according to an exemplary embodiment of the present invention includes a vehicle 100, and a vehicle access control center 200 which communicate via a wireless communication.

The vehicle 100 includes a wireless communication unit 110, an image input unit 120, a controller 130, a storage 140, and a display unit 150.

More specifically, the wireless communication unit 110 performs wireless communications with the vehicle access control center 200 and sends the results of a driver identification procedure within the vehicle to the vehicle access control center 200. In the illustrative embodiment of the present invention, the wireless communication may include IRs (infrared rays), RFs (Radio Frequency), BLUETOOTH®, WiFi, ZIGBEE®, NFC (Near Field Communication), RFID (Radio Frequency Identification) and the like.

The present invention may be commonly applied to many different makes, models and types of vehicles through a standard packet which is transmitted via the wireless communication.

In accordance with the illustrative embodiment of the present invention, the image input unit 120 may include a camera that is configured to photograph a driver's face upon request from the controller 130.

Along those lines, the controller 130 is configured to send a request to the image input unit 120 to photograph a driver's face, and receive the data associated with the photographed image from the image input unit 120.

For example, the control 130 may request a driver's face be photographed when the vehicle is stopped and the ignition is turned on. Alternatively, the control unit 130 may also request the driver's face be photographed when a door of the vehicle is opened or closed. Accordingly, the controller 130 may then analyze the driver's facial characteristics, (e.g., their eyes, nose, mouth and/or ears), from the data associated with the image received from the image input unit 120. In doing so, the control unit 130 extracts the facial characteristic information based the facial characteristics that have been detected in the previous step.

For example, the facial characteristic information in accordance with the illustrative embodiment of the present invention may include the distance between the driver's eyes, the distance between the driver's nose and mouth, the distance between two or more facial features (e.g., the eyes, nose, mouth and ears), and frequency information of the entire face in the image. The technology for extracting facial characteristic information is implemented with a technique for extracting information from normal data which is related or associated with an image.

Once the facial characteristics of the driver have been extracted from the photographed image, the controller 130 then determines whether a user having identical facial characteristic information exists within facial characteristic information that has been previously stored in a storage unit 140. In doing so, the extracted facial characteristic information is compared with facial characteristic information stored in the storage 140, to determine whether a positive verification/identification can be made. That is, a positive verification can be made when the driver has identical facial characteristic information as the information already stored for the driver on within the storage unit 140. In response to a positive verification/identification, the driver's information (e.g., their facial characteristic information, additional information, and vehicle information) is then sent to the vehicle access control center 200 via the wireless communication unit 110.

If, however, positive identification of the driver's face is not made, the controller 130 may determine that user is not registered and begin a new registration of this driver.

With particular reference to the storage unit 140, user/driver information (e.g., facial characteristic information, additional information, and vehicle information) which is registered for facial verification may be stored accordingly. Furthermore, examples of additional information may include personal information such as a driver's name, social security number, address, telephone number, etc. Examples of vehicle information may include information such the make and/or model of a vehicle, a frame serial number, etc.

Moreover, the face characteristic information may include the distance between two or more facial characteristics (e.g., eyes, nose, mouth and ears), and frequency information of the entire face within the image.

A display unit 150 may also be installed in the interior of the vehicle. More particularly, the display unit 150 may be configured to display a verification result and an input screen for new user registration to input user information for registration of a new driver in the facial recognition system. Moreover, the display unit 150 may also be configured to display information relating to the verification of the driver's facial features on the screen so that drive can verify its accuracy.

Again referring to FIG. 1, the vehicle access control center 200 includes a wireless communication unit 210, an access management unit 220, a storage unit 230, and a gate controller 240. The wireless communication unit 210 performs wireless communications with the vehicle 100 to aide in efficient verification of a driver within the vehicle.

In the illustrative embodiment of the present invention, the access management unit 220 compares the driver information (e.g., their facial characteristic information, additional information, and vehicle information) received from the vehicle 100 with access person information stored on the storage unit 230 (e.g., facial characteristic information, additional information, and vehicle information) to determine whether both pieces of information are identical, thereby positively identifying the driver of the vehicle.

The access management unit 220 performs a registration/delete of the access person information stored in the storage unit 230 and sends a gate control command to the gate controller 240 when the driver has been positive identified and cleared to enter. That is, the access management unit 220 requests a gate be opened when positive identification/verification has been made while requesting a closing of gate or continued closure of the gate when the driver's facial identification has been denied.

More particularly, the storage unit 230 stores access person information (e.g., facial characteristic information, additional information, and vehicle information) with respect to a driver who is allowed to access the facility. Additionally, the gate controller 240 may be controlled by the access management unit 220 to control the opening and closing of gate.

Hereinafter, a method for managing entrance and exit via driver facial identification within a vehicle according to an exemplary embodiment of the present invention is described in detail with reference to FIG. 2.

The controller 130 of the vehicle 100 first determines whether a driver has gotten into the vehicle (S101). For example, the controller 130 may determine whether a drive gets into the vehicle by either checking whether the ignition has been turned on, or whether a door of the vehicle has been opened or closed. Then, the controller 130 requests that the image input unit 120 photograph the face of driver (S102). The image input unit 120 then sends the data associated with photographed image to the controller 130, and the controller 130 extracts facial characteristic information from the image data (S103). For example, the facial characteristic information may include the distance between the driver's eyes, the distance between the driver's nose and mouth, the distance between two or more facial characteristics (e.g., their eyes, nose, mouth and ears), frequency information of the entire within the image, etc. The frequency information of the entire face means the facial characteristics information for analyzing a horizontal/vertical frequency ingredient of the photographed image as a two-dimensional discrete signal. The frequency analysis, which enables not only a frequency analysis of the entire face but also a frequency analysis of the local face (Short time Fourier transform, Wavelet transform, etc.)

Accordingly, the technology for extracting facial characteristic information is implemented via a technique of extracting information from normal image data.

Subsequent to extracting the driver's facial characteristics information, the controller 130 compares user's facial characteristic information stored in the storage 140 with the extracted facial characteristic information to determine whether a corresponding driver is a registered user (S104). At this time, the controller 130 determines that the driver's facial features or characteristics have been positively identified when the user's facial characteristic information is identical with the extracted facial characteristic information. The control unit 130, however, determines that the driver is not a registered user when the user's facial characteristic information is not identical with the extracted facial characteristic information.

When a corresponding driver is determined to be an unregistered user in step 104, the display unit 150 may be configured to display a identification error on a screen and display a screen for creating or inputting information for a new registration, so that personal information input by the unregistered driver can be associated with the facial characteristics extracted from the photograph. Upon completion of the registration process, the control unit then stores the facial characteristic information in the storage unit 140, thereby performing a new registration (S105).

However, when a driver is determined to be a registered user as a result of step 104, the vehicle 100 wirelessly transmits driver information (e.g., their facial characteristic information, additional information, and vehicle information) to the vehicle access control center 200 (S106).

Upon receiving this driver information from the vehicle, the access management unit 220 of the vehicle access control center 200 compares the facial characteristic information among the driver information received from the vehicle 100 with access person information (e.g., facial characteristic information, additional information, and vehicle information) stored in the storage unit 230, to determines whether a corresponding driver is a registered user of that facility (S107).

At this time, when the facial characteristic information received in the step 107 is identical with the facial characteristic information stored in the storage unit 230, the access management unit 220 determines whether the corresponding driver is a registered user for that facility. Here, a registered user means a user who is permitted to access the facility.

In the present invention, it is illustrated that both pieces face characteristic information are compared each other in step 107, but it can be embodied in such a manner that a user is determined to be a user is granted access to the facility in respect to additional information and respective vehicle information which may also be compared.

When a corresponding driver is determined to be a user who is permitted to access in step 107, the access management unit 220 requests the gate controller 240 to open the gate so that the corresponding driver and vehicle may enter the facility (S108).

Alternatively, when a corresponding driver is determined to be a user who is not registered in step 107, the access management unit 220 requests the gate controller 240 to close the gate or continue to keep the gate closed, to restrict the entrance of the corresponding driver to the facility (S109), and may be configured to further perform a new registration for the driver (S110).

As described above, in the present invention, a driver's face is not separately photographed for identification only but automatically photographed within a vehicle upon entrance to the vehicle. Thus, the present invention provides a system and method that is both efficient and convenient. Furthermore, the present invention may be configured to perform a double identification within a vehicle and in a vehicle access control system respectively so that identification/verification efficiency is improved.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A system for managing entrance and exit of a vehicle from a facility using a driver's facial identification within a vehicle, the system comprising:

a vehicle configured to photograph a driver's face using a camera in the vehicle and to extract facial characteristic information from the photographed image data to perform a first driver identification operation immediately after a driver gets into the vehicle, and send the facial characteristic information via a wireless communication to a vehicle access control center if a positive identification of the driver's face was made in the first driver identification and the vehicle is passing a gate for vehicle access; and the vehicle access control center configured to perform a second driver identification operation of the face of the driver by comparing the facial characteristic information received from the vehicle with the facial characteristic information stored in the vehicle access control center and to control an opening and closing of a gate for vehicle access according to a result of the second driver identification operation of the face of the driver.

2. The system of claim 1, wherein the vehicle further comprises:

the wireless communication configured to perform wireless communications with the vehicle access control center;

a camera configured to photograph the driver's face within the vehicle;

a storage configured to store facial characteristic information of the driver; and a controller configured to extract facial characteristic information from data associated with the photographed image, compare the extracted facial characteristic information with the facial characteristic information of the storage to perform the first driver identification operation of the driver.

3. The system of claim 2, wherein the controller is further configured to make a positive identification of the driver when the extracted facial characteristic information is identical to the facial characteristic information of the storage.

4. The system of claim 3, wherein the controller is further configured to determine that the driver is not registered to the system when the extracted facial characteristic information is not identical with the facial characteristic information of the storage and initiates a new registration process in response to the determination that the driver is not registered.

5. The system of claim 4, wherein the vehicle further comprises a display configured to display a result of the first driver identification operation and a screen for inputting information for the new registration process.

6. The system of claim 1, wherein the vehicle access control center comprises:

the wireless communication configured to communicate with a wireless communication of one or more vehicles;

a storage configured to store facial characteristic information for one or more individuals having permission to access the facility;

an access management controller configured to compare the facial characteristic information received from the vehicle with the facial characteristic information stored in the storage unit to perform the second driver identification operation of the driver of the vehicle; and a gate controller configured to control an opening and closing of a gate in response to a request from the access management controller.

7. The system of claim 2, wherein the vehicle access control center comprises;

wireless communication configured to communicate via a wireless communication with the vehicle;

a storage configured to store facial characteristic information for one or more individuals having permission to access the facility;

an access management controller configured to compare the facial characteristic information received from the vehicle with the facial characteristic information stored in the storage to perform the second driver identification operation of the driver's face; and a gate controller configured to control an opening and closing of a gate in response to a request from the access management controller.

8. The system of claim 1, wherein the wireless communication is performed by using one of a group consisting of an infrared ray (IR), a radio frequency (RF), WiFi, a near field communication (NFC), and a radio frequency identification (RFID).

9. The system of claim 2, wherein the wireless communication is performed by using one of a group consisting of an infrared ray (IR), a radio frequency (RF), WiFi, a near field communication (NFC), and a radio frequency identification (RFID).

10. The system of claim 2, wherein the controller is further configured to send a request to the camera to photograph the driver's face in response the vehicle ignition being turned on while the vehicle is stopped.

11. A method for managing entrance and exit of a vehicle from a facility using a driver facial identification operation within a vehicle, the method comprising:

photographing a face of driver within a vehicle using a camera in the vehicle immediately after a driver gets into the vehicle;

extracting facial characteristic information from data associated with the photographed image of the driver's face;

performing a first driver identification operation in the vehicle by using the extracted facial characteristic information;

if a positive identification of the driver's face was made in the first driver identification operation and vehicle is passing a gate for vehicle access, sending the facial characteristic information to a vehicle access control center via a wireless communication;

performing a second driver identification operation of the face of the driver in the vehicle by comparing the facial characteristic information sent to the vehicle access control center with facial characteristic information stored in the vehicle access control center; and opening a gate to allow the vehicle to access the facility in response to a positive verification.

12. The method of claim 11, wherein photographing a face of driver further comprises photographing the face of driver when either when the vehicle ignition is turned on or when a door of vehicle is opened or closed, and the vehicle is stopped.

13. The method of claim 11, wherein performing the driver identification operation further comprises determining that a positive identification has been made when the facial characteristic information of a driver which is previously stored is identical to the extracted facial characteristic information.

14. The method of claim 11, wherein the wireless communication is performed by using one of a group consisting of an infrared ray (IR), a radio frequency (RF), WiFi, a near field communication (NFC), and a radio frequency identification (RFID).

15. The method of claim 11, wherein opening the gate to allow the vehicle to access the facility further comprises opening the gate in response to a positive verification of the driver, wherein a positive verification of the driver is made when facial characteristic information sent to the vehicle access center is identical to facial characteristic information previously stored for an individual that is allowed to access the facility.

16. The method of claim 11, wherein opening the gate to allow a vehicle to access a facility is requested in response to the comparing additional information and vehicle information as well as the facial characteristic information and achieving a positive verification based on the comparison.

17. The method of claim 16, wherein the additional information comprises a social security number, a name, an address, and a telephone number of driver, and the vehicle information comprises a vehicle manufacturing company, a model name, and a frame serial number.

* * * * *